United States Patent
Takahashi et al.

(10) Patent No.: US 8,593,675 B2
(45) Date of Patent: Nov. 26, 2013

(54) SCAN BACK CONTROL OF STACKED RECEIVED FAXES

(75) Inventors: Daisuke Takahashi, Foster City, CA (US); Isao Hayami, Yokohama (JP)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 233 days.

(21) Appl. No.: 13/074,449

(22) Filed: Mar. 29, 2011

(65) Prior Publication Data

US 2012/0250051 A1    Oct. 4, 2012

(51) Int. Cl.
*G06F 3/12*    (2006.01)

(52) U.S. Cl.
USPC .......................... 358/1.15; 358/1.13; 358/1.14

(58) Field of Classification Search
USPC .......... 358/512, 515, 521, 1.1–1.9, 1.11–1.18
See application file for complete search history.

(56) References Cited

U.S. PATENT DOCUMENTS

| | | | |
|---|---|---|---|
| 5,243,381 A * | 9/1993 | Hube | 399/84 |
| 2007/0046992 A1* | 3/2007 | Matsuda et al. | 358/1.15 |
| 2008/0239329 A1* | 10/2008 | Kitada et al. | 358/1.1 |
| 2009/0141300 A1* | 6/2009 | Yamada et al. | 358/1.13 |

* cited by examiner

*Primary Examiner* — King Poon
*Assistant Examiner* — Ibrahim Siddo
(74) *Attorney, Agent, or Firm* — Buchanan Ingersoll & Rooney PC

(57) ABSTRACT

A method of selectively printing facsimiles on an image forming apparatus, the method includes the steps of: receiving incoming facsimiles on the image forming apparatus, each of the incoming facsimiles having one or more pages; printing at least one page of each of the incoming facsimiles; storing an entirety of each of the incoming facsimiles in a memory of the image forming apparatus; selectively printing incoming facsimiles by scanning the at least one page on the image forming apparatus to retrieve the entirety of a selected incoming facsimile from the memory of the image forming apparatus; and printing the entirety of the selected incoming facsimile.

22 Claims, 5 Drawing Sheets

SCAN BACK CONTROL OF STACKED RECEIVED FAXES

FIELD OF THE INVENTION

This invention relates to a method and system for preventing an image forming apparatus from printing unwanted facsimiles (faxes) in their entirety, and more particularly to a method and system having scan back control of a stack of incoming facsimiles for retrieval and deletion of temporarily stored incoming facsimiles (or faxes).

BACKGROUND OF THE INVENTION

Facsimiles (or faxes) are a telecommunications technology used to send/receive copies of documents (facsimiles) using devices placed in communication over a network such as a telephone network (i.e., telecommunication network) and/or Internet. Traditionally, when sending documents to people at long distances or who are remotely located, fax transmission has a distinct advantage over postal mail or courier in that the delivery of the document is nearly instantaneous.

Fax machines enable the electronic transmission and reception of facsimiles (faxes) to a recipient. Although devices for transmitting printed documents electrically have existed in various forms since the mid-20th century, modern fax machines became relatively widely available in the mid-1970s as electronic sophistication increased with expanding infrastructure and costs of technologies decreased. Over time, faxing gradually became affordable, and by the mid-1980s, fax machines were widely used in commerce. Today, fax machines not only include devices, which are solely for sending and receiving faxes, but can also include devices such as computers, personal digital assistants, and image forming apparatuses such as multi-functional printers (or MFPs).

Although the technology has faced increasing competition from Internet-based document transmission systems, fax devices still retain their advantages particularly in the transmission of sensitive material which, due to legislative mandates regarding privacy such as, for instance, the Health Insurance Portability and Accountability Act (HIPAA), cannot be transmitted over the Internet unencrypted. In many countries, electronic signatures on faxed documents such as contracts and other agreements are recognized as binding.

Fax machines typically consist of an image scanner, a communications interface (modem), and a graphic user interface (GUI) for the interaction of the user with the fax device. An image scanner optically scans a document and converts it to a digital image. In operation, a user places a page of a document to be electronically transmitted onto the surface of the platen, enters a telephone number of a fax device into a graphical user interface (GUI), and then hits a "SCAN" or "SEND" button. The document is scanned into a digital representation and stored in memory. The fax machine then dials the telephone number of the recipient fax machine. Once the communication between the sending machine and the receiving machine has been established, the digitized image is transmitted.

It can be appreciated that unsolicited fax advertising and/or other unwanted faxes (i.e., junk faxes) are very common today and can randomly be sent by computer devices over the Internet and telecommunication lines to multiple fax machines without much effort. It can be appreciated that by selectively printing faxes, a reduction in total fax paper consumption can be obtained as well as reducing the use of printing supplies including toner, ink and/or other print material, and other natural resources for faxes, which are not wanted or requested by the recipient. Furthermore, a system or method as described herein can reduce the burden of separating necessary (or wanted) faxes from those which are not wanted when each of the faxes comprise one or more pages or sheets. Accordingly, it would be desirable in accordance with an exemplary embodiment to have a system and method for an image forming apparatus, which selectively prints incoming facsimiles and faxes.

OBJECTS AND SUMMARY

The present invention has been made in consideration of the above issues, and provides a system and method of selectively preventing facsimiles on an image forming apparatus such that each and every page or sheet of an unwanted facsimiles is not printed by the image forming apparatus.

In accordance with an exemplary embodiment, a method of selectively printing facsimiles on an image forming apparatus, the method comprises: receiving incoming facsimiles on the image forming apparatus, each of the incoming facsimiles having one or more pages; printing at least one page of each of the incoming facsimiles; storing an entirety of each of the incoming facsimiles in a memory of the image forming apparatus; selectively printing incoming facsimiles by scanning the at least one page on the image forming apparatus to retrieve the entirety of a selected incoming facsimile from the memory of the image forming apparatus; and printing the entirety of the selected incoming facsimile.

In accordance with another exemplary embodiment, a computer program product comprising a non-transitory computer usable medium having a computer readable code embodied therein, the computer readable program code configured to cause an image forming apparatus to execute a process for selectively printing facsimiles on the image forming apparatus, the process comprising the steps of: receiving incoming facsimiles on the image forming apparatus, each of the incoming facsimiles having one or more pages; printing at least one page of each of the incoming facsimiles; storing an entirety of each of the incoming facsimiles in a memory of the image forming apparatus; selectively printing incoming facsimiles by scanning the at least one page on the image forming apparatus to retrieve the entirety of a selected incoming facsimile from the memory of the image forming apparatus; and printing the entirety of the selected incoming facsimile.

In accordance with a further exemplary embodiment, a printing system comprises: a hosting device, which sends incoming facsimile data; and an image forming apparatus having a memory unit and a print engine connected to the memory unit for forming an image on a recording medium, wherein the image forming apparatus performs the following steps: receiving incoming facsimiles on the image forming apparatus, each of the incoming facsimiles having one or more pages; printing at least one page of each of the incoming facsimiles on the recording medium; storing an entirety of each of the incoming facsimiles in a memory of the image forming apparatus; selectively printing incoming facsimiles by scanning the at least one page on the image forming apparatus to retrieve the entirety of a selected incoming facsimile from the memory of the image forming apparatus; and printing the entirety of the selected incoming facsimile on the recording medium.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
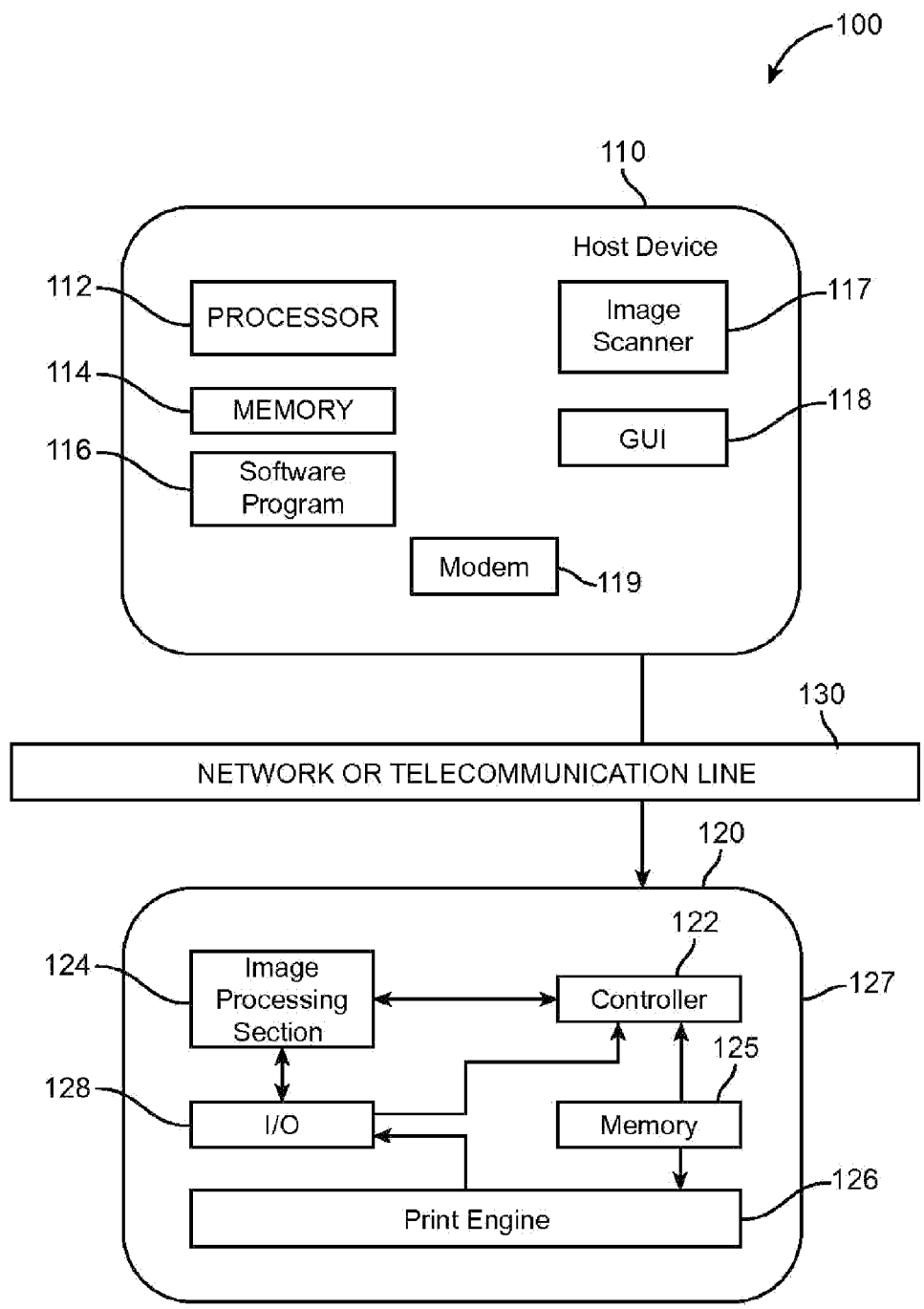
FIG. 1 is a diagram of a system, which includes a host device, which sends facsimile data and an image forming apparatus connected to the host device, which receives facsimile data in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

In accordance with an exemplary embodiment, a system and method of selectively preventing facsimiles on an image forming apparatus such that each and every page or sheet of an unwanted facsimiles is not printed by the image forming apparatus. The following illustrations describe the process of this method and a system for implementation thereof.

The methods described herein can be implemented in a system 100 that includes a host device 110 preferably in the form of a facsimile machine ("fax machine) or computer device, and an image forming apparatus 120 preferably in the form of a multi-functional printer (MFP) connected to the host device 110. A typical structure of the system 100 is shown in FIG. 1.

The host device 110 (i.e., facsimile machine) includes a processor 112 and one or more memories 114 for storing software programs 116 and data (such as files to be printed). If the host device 110 is a fax machine, the device 110 will include an optical image scanner 117, a graphical user interface 118, and a modem for receiving and transmitting facsimiles 119. In accordance with an exemplary embodiment, the host device 110 has a facsimile section for facsimile receiving and transmitting image data in the form of a fax job (i.e., fax data) to the image forming apparatus (or printer) 120. The fax job includes data representing the documents to be printed and information describing a fax job. It can be appreciated that as used herein, a fax or facsimile can include telecommunication faxes and/or Internet faxes, which are sent via an Internet connection.

The image forming apparatus (or printer) 120 typically includes a controller 122, an image processing section (or data dispatcher) 124, a print engine 126, and an input/output (I/O) section 128. The controller 122 may include a central processing unit (CPU), a random access memory (RAM), and a read only memory (ROM). The controller 122 processes the data and job information received from the host device 110 to generate a print image. The image processing section 124 carries out various image processing under the control of the controller 122, and sends the processed print image data to the print engine 126. The image processing section 124 also includes a scanner section for optically reading a document, such as an image recognition system. The print engine 126 forms an image on a recording sheet based on the image data sent from the image processing section 124. The I/O section performs data transfer with the host device 110. The controller 122 is programmed to process data and control various other components of the image forming apparatus 120 to carry out the various methods described herein.

The input/output (I/O) port 128 provides communications between the printer section and the host device 110 and receives page descriptions (or print data) from the host for processing within the image forming apparatus 120. In accordance with an exemplary embodiment, the operation of printer section commences when it receives a page description from the host device 110 via I/O port 128 in the form of a print job data stream and/or fax data stream. The image forming apparatus 120 also preferably includes an auto feeding mechanism or tray 127, wherein a user can feed one or more sheets or pages of a printed image or document to the image processing section 124 for imaging and processing.

The host device 110 and the image forming apparatus (or printer) 120 are preferably connected to one another via a public telecommunication line and/or a network (e.g., LAN or WAN) 130. Examples of the telecommunication line and/or network 130 consistent with embodiments of the invention include, but are not limited to, telecommunication or telephone lines, the Internet, an intranet, a local area network (LAN), a wide area network (WAN) and/or a wireless connection using radio frequency (RF) and/or infrared (IR) transmission.

Examples of image forming apparatuses 120 consistent with exemplary embodiments of the invention include, but are not limited to, a facsimile machine, a multi-functional printer (MFP), a laser beam printer (LBP), an LED printer, a multi-functional laser beam printer including copy function. In accordance with an exemplary embodiment, the image forming apparatus 120 is preferably a color printer or a black and white (B/W) printer. In accordance with another exemplary embodiment, the image forming apparatus 120 is configured as a multi-functional printer (MFP) device or all-in-one (AIO) that includes a printer section for converting print data or fax data inputted from outside to image data and forming and printing out the converted image onto a printable media, a scanner section for optically reading a document (i.e., an image recognition system), and a facsimile section for facsimile receiving and transmitting image data to and from external apparatuses through public telecommunication lines.

In accordance with an exemplary embodiment, a method and system is disclosed, which prevents an image forming apparatus 120 from printing each and every page of unwanted facsimiles. It can be appreciated that the method includes receiving an incoming facsimile (or fax data) consisting of one or more pages, which is received by an image forming apparatus 120 and/or fax machine. Upon receiving the incoming facsimile or fax data, and the image forming apparatus 120 preferably prints only the first page of the fax and the data associated with the entirety of the fax is moved into a storage (or database) in order to be kept until retrieved and/or deleted by the recipient.

In accordance with an exemplary embodiment, the stored data (i.e., fax data) is preferably linked to the first image which has been printed by the image forming apparatus 120, and which has been ejected and/or placed on an output tray. The recipient (or user) keeps the printed first pages of each of the faxes for use later. It can be appreciated that at this point, in accordance with an exemplary embodiment, the image forming apparatus 120 can save total fax-paper output by printing only the first pages of each of the incoming faxes, compared to printing each and every page of the incoming facsimile upon receipt thereof. In accordance with an exemplary embodiment, the recipient (or user) reviews the printed first pages of the incoming faxes, and separates necessary or wanted faxes (i.e., those which need to be printed in their entirety) from unnecessary ones (i.e., those incoming faxes, which need not be printed and can be deleted from the memory and/or database of the image forming apparatus). It can be appreciated that the incoming facsimiles are preferably temporarily stored in a memory or database within the image forming apparatus 120. Furthermore, the image forming apparatus 120 can be programmed to delete the temporarily stored facsimiles after a certain number of days and/or can be stored until retrieved and/or deleted by the recipient and/or user (i.e., administrator).

In accordance with an exemplary embodiment, the recipient can retrieve the entirety (i.e., the rest of incoming fax pages) from the storage or data base of the image forming apparatus 120 by enabling a retrieval mode or "Fax Action Mode", within the image forming apparatus 120 by pressing a corresponding button. Alternatively, the enabling the retrieval mode can include one or more other means of enabling the retrieval functionality on the image forming apparatus 120. The recipient or user preferably sets the first page or first pages of each of the incoming faxes, in which he/she wants to retrieve within an auto feeder for an image forming apparatus 120 having a copier and/or scanner, and scans the first page of each of the faxes through an optical scanner or scanning system on the image forming apparatus 120. The image forming apparatus 120 preferably includes an image recognition system, which verifies the image of the first page of faxes, and upon confirmation, matches the scanned image with the images stored in its storage (or database) and links the fax data to the scanned first page of the incoming fax. The image forming apparatus 120 retrieves the rest or entirety of the pages linking to the images (i.e., incoming fax) and prints out the whole (or entirety) of each of the selected incoming faxes.

In order to delete unnecessary fax data (or incoming facsimiles) corresponding to the printed out first pages (or at least one page), the user can mark and/or cross out all and/or a portion of the first pages (or at least one page), which he/she wants to delete permanently from the image forming apparatus' memory and/or data base. Once again, the recipient or user enables a deletion mode or "Fax Action Mode" within the image forming apparatus by pressing a corresponding button. Alternatively, the deletion mode or functionality can be enabled by one or more other means on the image forming apparatus 120. The recipient or user sets the crossed out first page, which he/she wants to delete from the image forming apparatus 120 on the scanner or auto feeder of the image forming apparatus, and the image recognition system or software associated with the image forming apparatus 120 verifies the image of the first page of faxes. Once the image forming apparatus 120 confirms that the image or images match any of the images which are stored in its memory, the at least one page is linked to the rest of fax data, and the image forming apparatus deletes the rest or entirety of the pages linked to the crossed out or marked out images.

Figure 2:
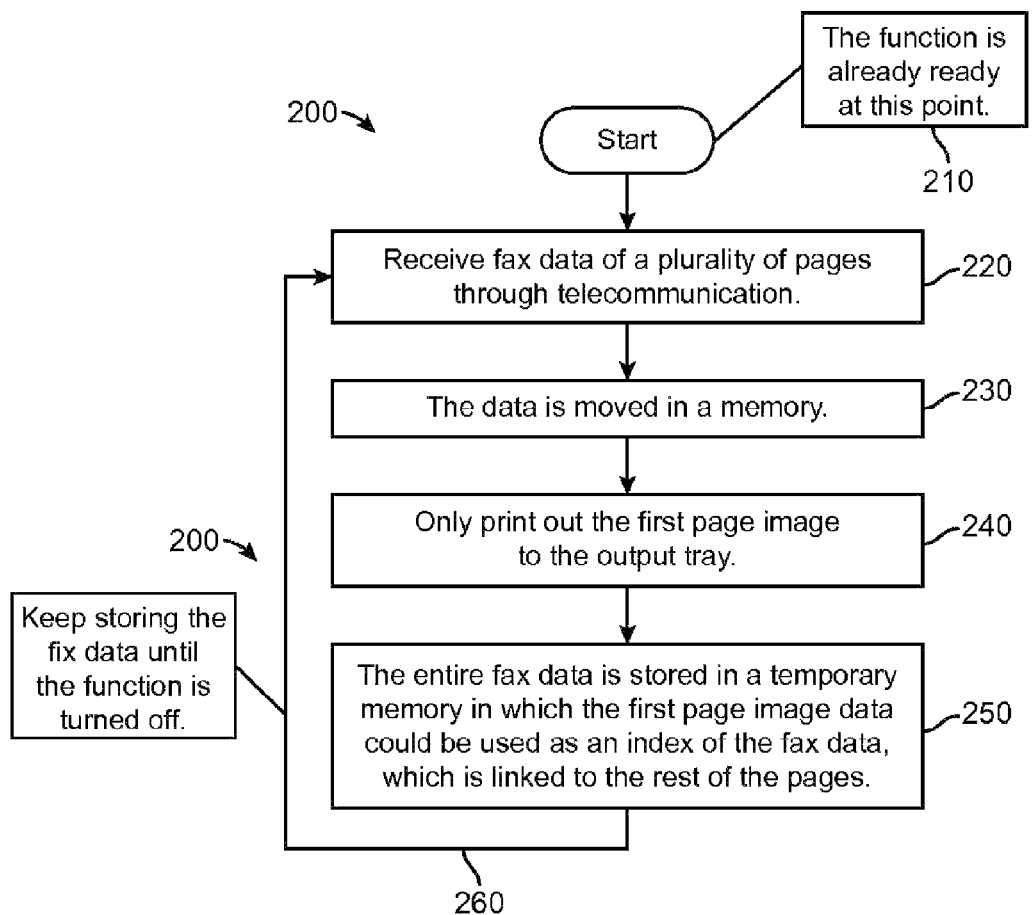
FIG. 2 is a flow chart of a method of printing at least one page of an incoming fax in accordance with an exemplary embodiment.

FIG. 2 is a flow chart of a method of printing only at least one page 200 of an incoming fax in accordance with an exemplary embodiment. As shown in FIG. 2, in step 210, an image forming apparatus has a functionality, which is enabled and prevents unwanted incoming facsimiles or faxes from printing in their entirety. In step 220, the image forming apparatus receives an incoming fax data (i.e., an incoming facsimile) comprising a plurality of pages through a telecommunication line and/or network connection. The incoming fax data comprises a fax ("facsimile") having one or more pages. In step 230, the incoming fax data is moved into a memory unit and/or a temporary storage area within the image forming apparatus. It can be appreciated that the memory or storage area can be an external memory in communication with the image forming apparatus. In step 240, the image forming apparatus prints at least one page of the one or more pages for each of the incoming facsimile data. In accordance with an exemplary embodiment, the at least one page is the first page of each and every incoming facsimile (fax). In step 250, an entirety of each of the incoming facsimiles is stored in the memory of the image forming apparatus in which the first page (or image data of the first page) is used as an index of the fax data, and which is linked to the rest (or entirety) of the incoming fax. In step 260, the entirety of the incoming facsimiles are stored in the memory or storage area of the image forming apparatus and/or alternatively external memory or storage area until the functionality, which prevents unwanted incoming facsimiles from printing in their entirety is turned off.

Figure 3:
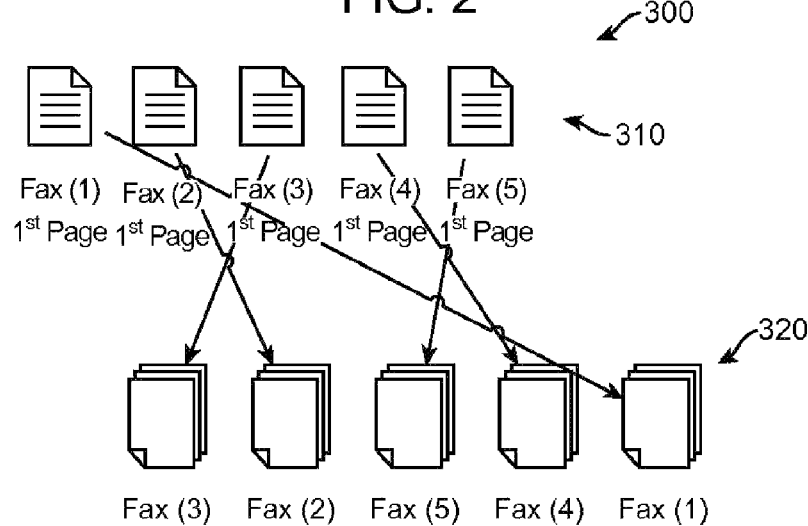
FIG. 3 is a diagram of a method of retrieving a facsimile from a plurality of incoming faxes, which have been received and stacked by an multi-functional printer ("MFP") in accordance with an exemplary embodiment.

FIG. 3 is a diagram of a method of retrieving a facsimile from a plurality of incoming faxes, which have been received and stacked by a multifunctional printer (or MFP) 300 in accordance with an exemplary embodiment. The incoming facsimiles 320 are received on the image forming apparatus, each of the incoming facsimiles 320 preferably having one or more pages. As shown in FIG. 3, at least one page 310 of each of the incoming facsimiles 320 is printed by the image forming apparatus and distributed to one or more users. The entirety of each of the incoming facsimiles 320 is stored in a memory or storage area of the image forming apparatus 120 for retrieval later. It can be appreciated that each of the incoming facsimiles 320 are preferably linked to the first page (or first image) 310, which has been printed via the image forming apparatus 120.

Figure 4:
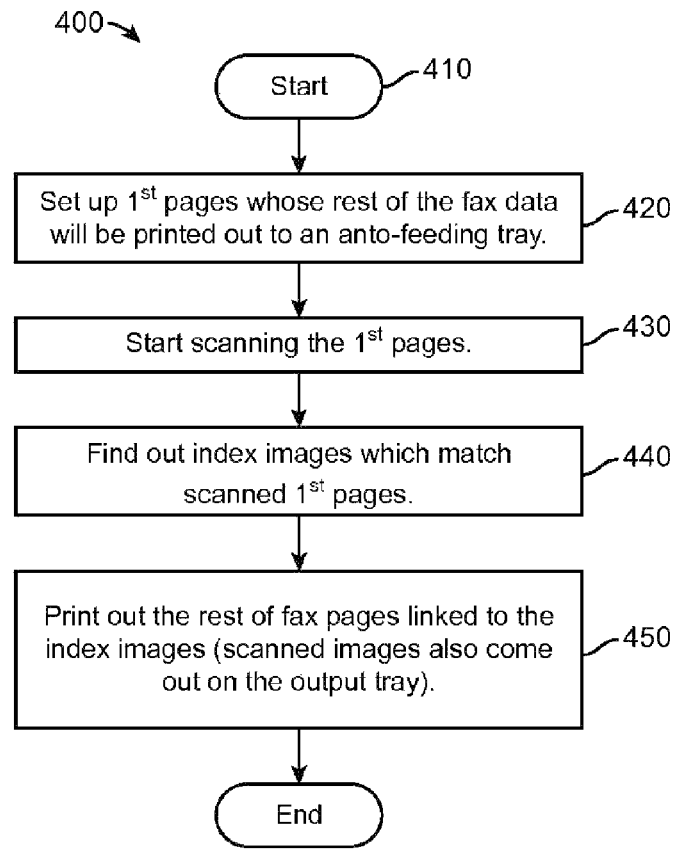
FIG. 4 is a flow chart of a method of printing a fax from a stack of received faxes in its entirety in accordance with an exemplary embodiment.

FIG. 4 is a flow chart of a method of printing a facsimile or fax 400 in accordance with an exemplary embodiment. As shown in FIG. 4, in step 410, the "Fax Action Mode" or functionality, which prevents unwanted incoming facsimiles or faxes from printing in their entirety, is enabled on the image forming apparatus. In step 420, the first page of each of the incoming faxes in which the user wishes to print in their entirety are gathered and placed on an auto-feed tray or other mechanism for feeding faxes and/or other documents to be scanned by the image forming apparatus. In step 430, the image forming apparatus scans each of the first pages of the incoming faxes, which are to be printed in their entirety. In step 440, the image recognition system and/or a program associated with the image forming apparatus matches or links the first page of the incoming faxes with the entirety of the corresponding incoming faxes, which have been temporarily stored by the image forming apparatus. In step 450, upon matching of the first pages to the corresponding entirety of the incoming faxes for each of the scanned first pages, the image forming apparatus prints the entirety of the incoming fax. Alternatively, the image forming apparatus may print the remaining pages of each incoming fax to provide the entire pages of the incoming fax by using the scanned first page as its first page.

Figure 5:
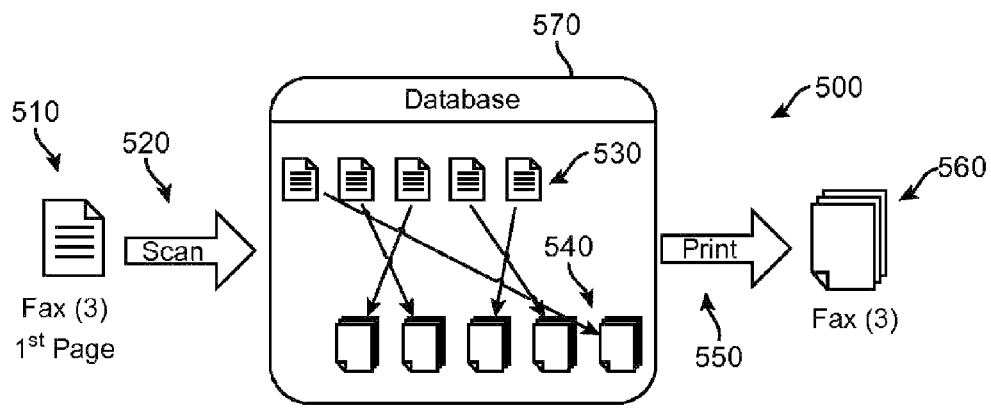
FIG. 5 is a diagram of a system for scan back control of stacked received faxes in accordance with an exemplary embodiment.

FIG. 5 is a diagram of a system 500 for scan back control of stacked received faxes in accordance with an exemplary embodiment. As shown in FIG. 5, the system 500 includes at least one page 510 of an incoming fax, which is scanned 520 and/or placed on an image recognition system within the image forming apparatus. Each of the at least one pages 530 of the incoming facsimiles, which has been recognized by the image recognition system is linked to a corresponding entirety of the incoming faxes 540 and printed 550 in its and/or their entirety 560. It can be appreciated that the incoming faxes are stored in their entirety in a temporary database and/or memory unit 570, which can be within the image forming apparatus and/or alternatively, the incoming faxes can be stored in an external database or memory unit.

Figure 6:
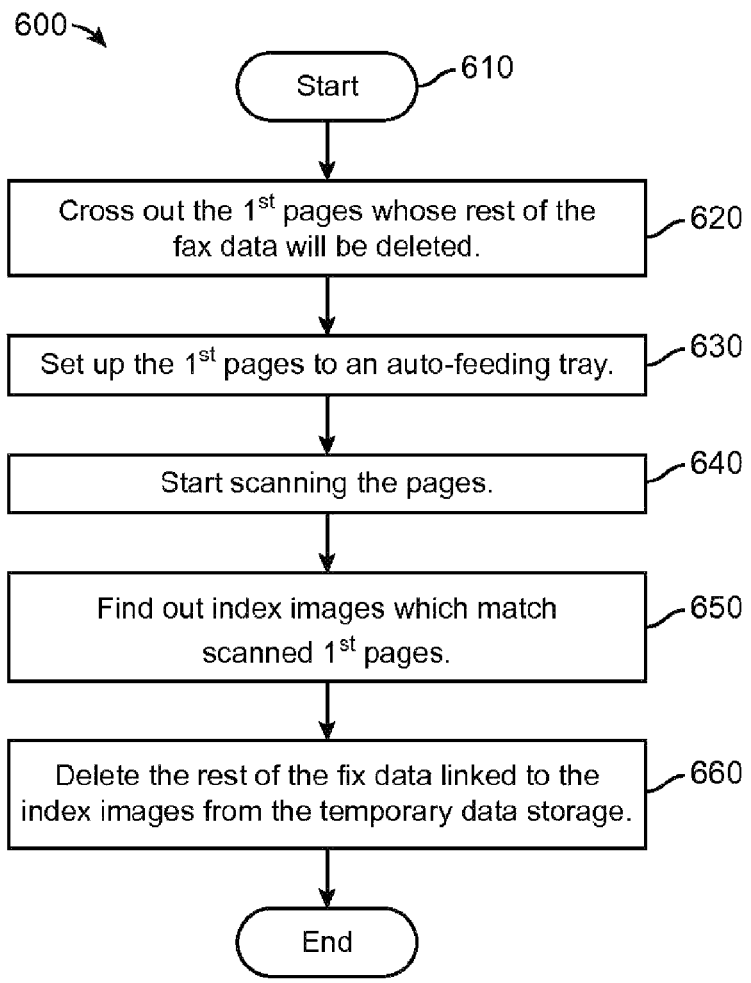
FIG. 6 is a flow chart of a method of deleting a fax from a stack of received faxes in accordance with an exemplary embodiment.

FIG. 6 is a flow chart of a method of deleting a fax from a stack of received faxes 600 in accordance with an exemplary embodiment. As shown in FIG. 6, in step 610, the functionality of the image forming apparatus is enabled, which prevents unwanted incoming facsimiles or faxes from printing in their entirety. In step 620, each of the first page of each of the incoming faxes in which the user (or recipient) does not wish to print, is marked with an "X", which extends across the first page of the incoming fax, and/or alternatively, some type of mark or identifier, which indicates to the image recognition system and associated program of the image forming apparatus that each of the incoming faxes identified with an "X" and/or other type of mark can be deleted from the memory unit and/or database. It can be appreciated that the user can use an "X" and/or any suitable identifier includes a mark, symbol, and/or image to indicate to the system that each of the incoming faxes can be deleted from the database. In step 630, each of the first pages in which the recipient wishes to delete is placed on an auto-feeding tray of the image forming apparatus. In step 640, the image forming apparatus scans each of the first pages of the incoming faxes, which should be deleted in their entirety. In step 650, the image recognition system (and/or program) associated with the image forming apparatus matches or links the first page of the incoming faxes with the entirety of the corresponding incoming faxes, which have been temporarily stored by the image forming apparatus. In step 660, upon matching of the first pages to the corresponding entirety of the incoming faxes for each of the scanned first pages, the image forming apparatus deletes the entirety of the incoming faxes. It is preferable to provide a user with a warning message to make sure if he/she wants to delete the entire data of the selected incoming fax.

Figure 7:
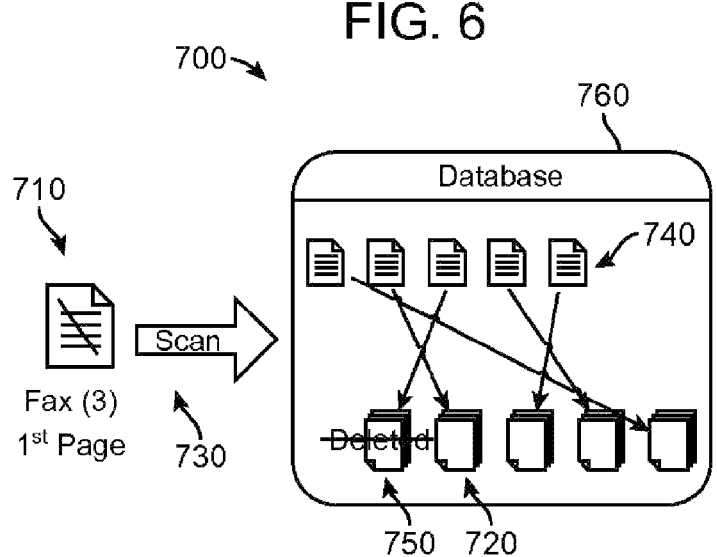
FIG. 7 is a diagram of a system of deleting a fax from a stack of received faxes in accordance with an exemplary embodiment.

FIG. 7 is a diagram of a system 700 of deleting an incoming fax 710 from a stack of received faxes 720 in accordance with an exemplary embodiment. As shown in FIG. 7, the system 700 includes at least one page of an incoming fax 710, which is scanned 730 and/or placed on an image recognition system and/or other suitable apparatus associated within the image forming apparatus. Each of the at least one page of the incoming facsimiles 740, which has been recognized by the image recognition system is linked to a corresponding entirety of the incoming facsimiles (or fax) 750 and deleted in its and/or their entirety. It can be appreciated that the incoming faxes in their entirety are stored in a temporary database and/or memory unit 760, which can be within the image forming apparatus and/or alternatively, an external database or memory unit.

Figure 8:
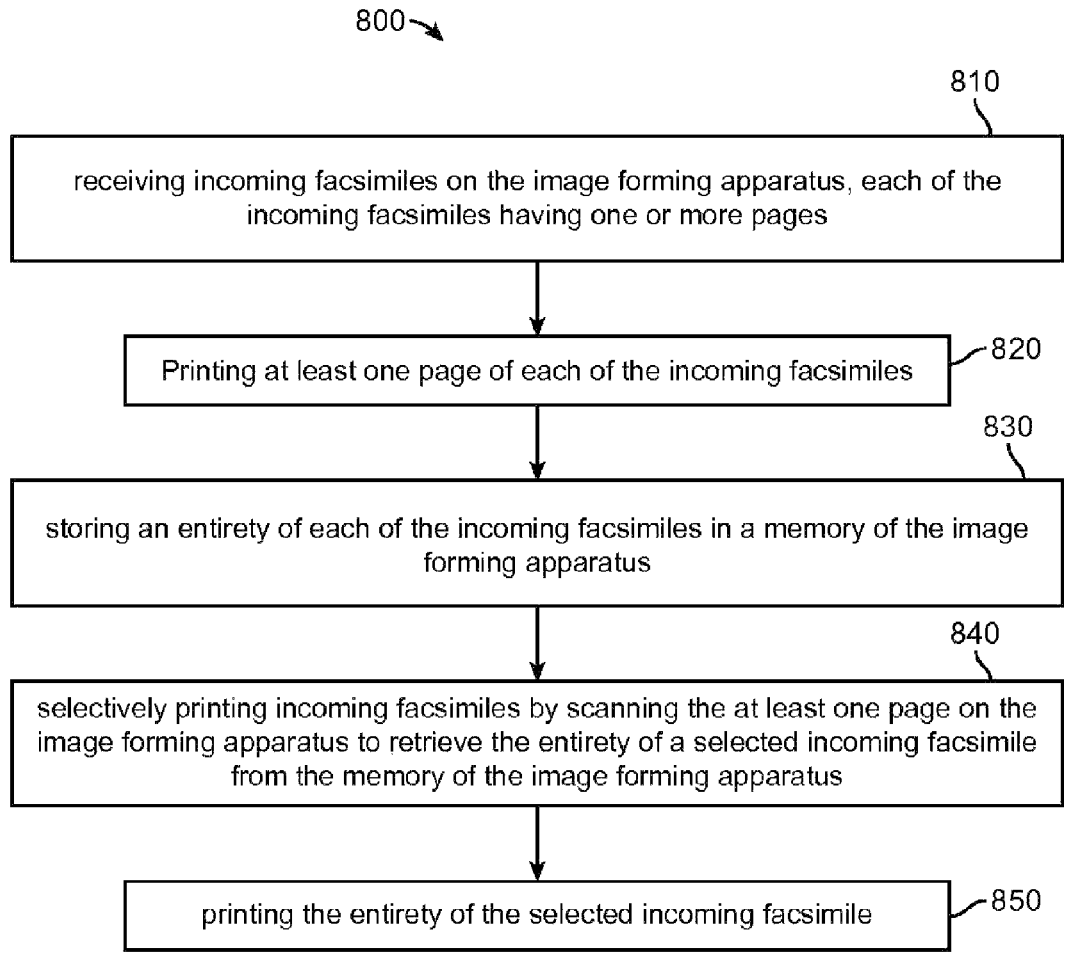
FIG. 8 is a flow chart of an exemplary embodiment of a method of preventing an image forming apparatus from printing unwanted facsimiles.

FIG. 8 is a flow chart of an exemplary embodiment of a method of selectively printing facsimiles on an image forming apparatus 800. As shown in FIG. 8, in step 810, the method includes receiving incoming facsimiles on the image forming apparatus, each of the incoming facsimiles having one or more pages. In step 820, at least one page of each of the incoming facsimiles is printed. In step 830, an entirety of each of the incoming facsimiles is stored in a memory of the image forming apparatus. In step 840, selectively printing of incoming facsimiles is performed by scanning the at least one page on the image forming apparatus to retrieve the entirety of a selected incoming facsimile from the memory of the image forming apparatus. In step 850, the entirety of the selected incoming facsimile is printed.

As an alternative embodiment of the present invention, the selective printing and deletion of the incoming facsimiles can be achieved at one time. For instance, non-marked first pages and marked first pages are piled together and set on the document feed tray. The image forming apparatus 120 may recognize the non-marked first pages and the marked first pages to distinguish the incoming facsimiles that the user wants to print out and the incoming facsimiles that the user wants to delete their data. Basically, this can be achieved by conducting the processes of FIGS. 4 and 6 with slight modification to add a step of distinguishably recognizing the non-marked and marked first pages.

In accordance with another exemplary embodiment, a computer program product comprising a non-transitory computer usable medium having a computer readable code embodied therein, the computer readable program code configured to cause an image forming apparatus to execute a process for selectively printing facsimiles on the image forming apparatus, the process comprising the steps of: receiving incoming facsimiles on the image forming apparatus, each of the incoming facsimiles having one or more pages; printing at least one page of each of the incoming facsimiles; storing an entirety of each of the incoming facsimiles in a memory of the image forming apparatus; selectively printing incoming facsimiles by scanning the at least one page on the image forming apparatus to retrieve the entirety of a selected incoming facsimile from the memory of the image forming apparatus; and printing the entirety of the selected incoming facsimile.

It can be appreciated that the process and method can be introduced into the image forming apparatus by updating the firmware in the non-volatile memory of the image forming apparatus 120. In this regard, the method may be brought to the image forming apparatus in a form of a package of install software and the firmware, which may be divided and/or compressed so that the install software effectively installs in the firmware. The package may be steadily stored in a computer readable diskette, such as a compact disk, or may be transmitted through a wire/wireless communication line.

The method described above can be used to print on paper or other suitable printing medium such as thin plastic sheets, etc. The computer readable medium, of course, can be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention can be implemented such that its software part has been written onto a recording medium in advance and will be read as required in operation.

Thus, as used in this disclosure and the appended claims, the term "image forming apparatus", "printer" or "printing device" should be broadly understood to refer to any machine that has a print function, including printers, copiers, and all-in-one machines which have printing, scanning and copying functions. The term "print job" and/or "printing" similarly include both printing and copying, i.e., it refers to producing images on a recording medium either from a data received from an external device such as a host device or host computer (i.e., facsimile machine) or from data generated by scanning an original hard copy.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method of selectively printing facsimiles on an image forming apparatus, the method comprising:
   receiving incoming facsimiles on the image forming apparatus, each of the incoming facsimiles having one or more pages;
   automatically printing only a first page of each of the incoming facsimiles upon receipt of each of the incoming facsimiles by the image forming apparatus;
   storing an entirety of each of the incoming facsimiles in a memory of the image forming apparatus;
   selectively printing incoming facsimiles by scanning the first page on the image forming apparatus to retrieve the entirety of a selected incoming facsimile from the memory of the image forming apparatus; and
   printing the entirety of the selected incoming facsimile.

2. The method of claim 1, further comprising linking each of the entirety of the incoming facsimiles, which is stored in the memory of the image forming apparatus to the first page, which has been printed by the image forming apparatus.

3. The method of claim 1, further comprising selectively printing incoming facsimiles by activating a facsimile retrieval mode on the image forming apparatus.

4. The method of claim 1, further comprising placing the first page of the incoming facsimile on an auto feeder of the image forming apparatus, and feeding the first page of the incoming facsimile through an image recognition system on image forming apparatus.

5. The method of claim 4, further comprising verifying the first page of each of the incoming facsimiles using the image recognition system, and upon confirming that the first page of the incoming facsimile matches an image stored in the memory of the image forming apparatus, linking the first page of the incoming facsimile to the entirety of the incoming facsimile, and retrieving the entirety of the one or more pages of the incoming facsimile from the memory of the image forming apparatus.

6. The method of claim 1, comprising:
   physically placing a mark on the first page of the incoming facsimile by a user and scanning the first page of the incoming facsimile having the mark thereon through an image recognition system within the image forming apparatus;
   verifying the first page of the incoming facsimile having the mark thereon using the image recognition system, and upon confirming that the first page of the incoming facsimile having the mark thereon matches an image stored in the memory of the image forming apparatus, linking the first page of the incoming facsimile having the mark thereon to the entirety of the incoming facsimile; and
   deleting the entirety of the incoming facsimile from the memory of the image forming apparatus.

7. The method of claim 1, further comprising:
   selectively printing incoming facsimile data by activating a facsimile retrieval mode on the image forming apparatus;
   placing the first page of the incoming facsimile on an auto feeder of the image forming apparatus, and feeding the first page of the incoming facsimile through an image recognition system of the image forming apparatus;
   verifying the image of the first page of incoming facsimiles using the image recognition system of the image forming apparatus, and upon confirming that the first page of the facsimile matches an image stored in the memory of the image forming apparatus, linking the first page of the incoming facsimile to the entirety of the incoming facsimile, and
   retrieving the entirety of the one or more pages of the incoming facsimile from the memory of the image forming apparatus.

8. The method of claim 4, wherein the image recognition system recognizes at least one image on the first page of the at least one incoming facsimile.

9. The method of claim 1, further comprising sending the incoming facsimile data over a telecommunication line and/or a network connection.

10. The method of claim 9, further comprising a host device, which sends the incoming facsimile data over the telecommunication line and/or network, and wherein the host device and/or the image forming apparatus is a facsimile machine.

11. The method of claim 1, wherein the step of printing the entirety of the selected incoming facsimile comprises printing the entirety of the incoming facsimile except for the first page, which was scanned into the image forming apparatus.

12. A computer program product comprising a non-transitory computer usable medium having a computer readable code embodied therein, the computer readable program code configured to cause an image forming apparatus to execute a process for selectively printing facsimiles on the image forming apparatus, the process comprising the steps of:
   receiving incoming facsimiles on the image forming apparatus, each of the incoming facsimiles having one or more pages;
   automatically printing only a first page of each of the incoming facsimiles upon receipt of each of the incoming facsimiles by the image forming apparatus;
   storing an entirety of each of the incoming facsimiles in a memory of the image forming apparatus;
   selectively printing incoming facsimiles by scanning the first page on the image forming apparatus to retrieve the entirety of a selected incoming facsimile from the memory of the image forming apparatus; and
   printing the entirety of the selected incoming facsimile.

13. The computer program of claim 12, further comprising linking each of the entirety of the incoming facsimiles, which is stored in the memory of the image forming apparatus to the first page, which has been printed by the image forming apparatus.

14. The computer program of claim 13, further comprising verifying the first page of each of the incoming facsimiles using the image recognition system, and upon confirming that the first page of the incoming facsimile matches an image stored in the memory of the image forming apparatus, linking the first page of the incoming facsimile to the entirety of the incoming facsimile, and retrieving the entirety of the one or more pages of the incoming facsimile from the memory of the image forming apparatus.

15. The computer program of claim 12, comprising:
   physically placing a mark on the first page of the incoming facsimile by a user and scanning the first page of the incoming facsimile having the mark thereon through an image recognition system within the image forming apparatus;
   verifying the first page of the incoming facsimile having the mark thereon using the image recognition system, and upon confirming that the first page of the incoming facsimile having the mark thereon matches an image stored in the memory of the image forming apparatus, linking the first page of the incoming facsimile having the mark thereon to the entirety of the incoming facsimile; and
   deleting the entirety of the incoming facsimile from the memory of the image forming apparatus.

16. A printing system comprising:
   a hosting device, which sends incoming facsimiles; and
   an image forming apparatus having a memory unit and a print engine connected to the memory unit for forming an image on a recording medium, wherein the image forming apparatus performs the following steps:
      receiving the incoming facsimiles, each of the incoming facsimiles having one or more pages;
      automatically printing only a first page of each of the incoming facsimiles on the recording medium upon receipt of each of the incoming facsimiles by the image forming apparatus;
      storing an entirety of each of the incoming facsimiles in a memory of the image forming apparatus;
      selectively printing incoming facsimiles by scanning the first page on the image forming apparatus to retrieve the entirety of a selected incoming facsimile from the memory of the image forming apparatus; and
      printing the entirety of the selected incoming facsimile on the recording medium.

17. The system of claim 16, wherein the first page of the incoming facsimile is placed on an auto feeder of the image forming apparatus, and the first page of the incoming facsimile is fed through an image recognition system on the image forming apparatus.

18. The system of claim 17, wherein the first page of each of the incoming facsimiles is verified using the image recognition system, and upon confirming that the first page of the incoming facsimile matches an image stored in the memory unit of the image forming apparatus, the first page of the incoming facsimile is linked to the entirety of the incoming facsimile, and the entirety of the one or more pages of the incoming facsimile is retrieved from the memory unit of the image forming apparatus.

19. The system of claim 18, wherein incoming facsimiles, which are stored on the memory unit of the image forming apparatus are deleted by:
   physically placing a mark on the first page of the incoming facsimile by a user and scanning the first page of the incoming facsimile having the mark thereon through an image recognition system within the image forming apparatus;
   verifying the first page of the incoming facsimile having the mark thereon using the image recognition system, and upon confirming that the first page of the incoming facsimile having the mark thereon matches an image stored in the memory of the image forming apparatus, linking the first page of the incoming facsimile having the mark thereon to the entirety of the incoming facsimile; and
   deleting the entirety of the incoming facsimile from the memory of the image forming apparatus.

20. The method of claim 6, wherein the step of physically placing the mark on the first page of the incoming facsimile by the user comprises the user marking and/or crossing out all and/or a portion of the first page of the incoming facsimile.

21. The computer program of claim 15, wherein the step of physically placing the mark on the first page of the incoming facsimile by the user comprises the user marking and/or crossing out all and/or a portion of the first page of the incoming facsimile.

22. The system of claim 19, wherein the step of physically placing the mark on the first page of the incoming facsimile by the user comprises the user marking and/or crossing out all and/or a portion of the first page of the incoming facsimile.

* * * * *